May 31, 1932.    W. L. HUTCHINSON    1,861,233
SIZING DEVICE
Filed June 11, 1930    3 Sheets-Sheet 1
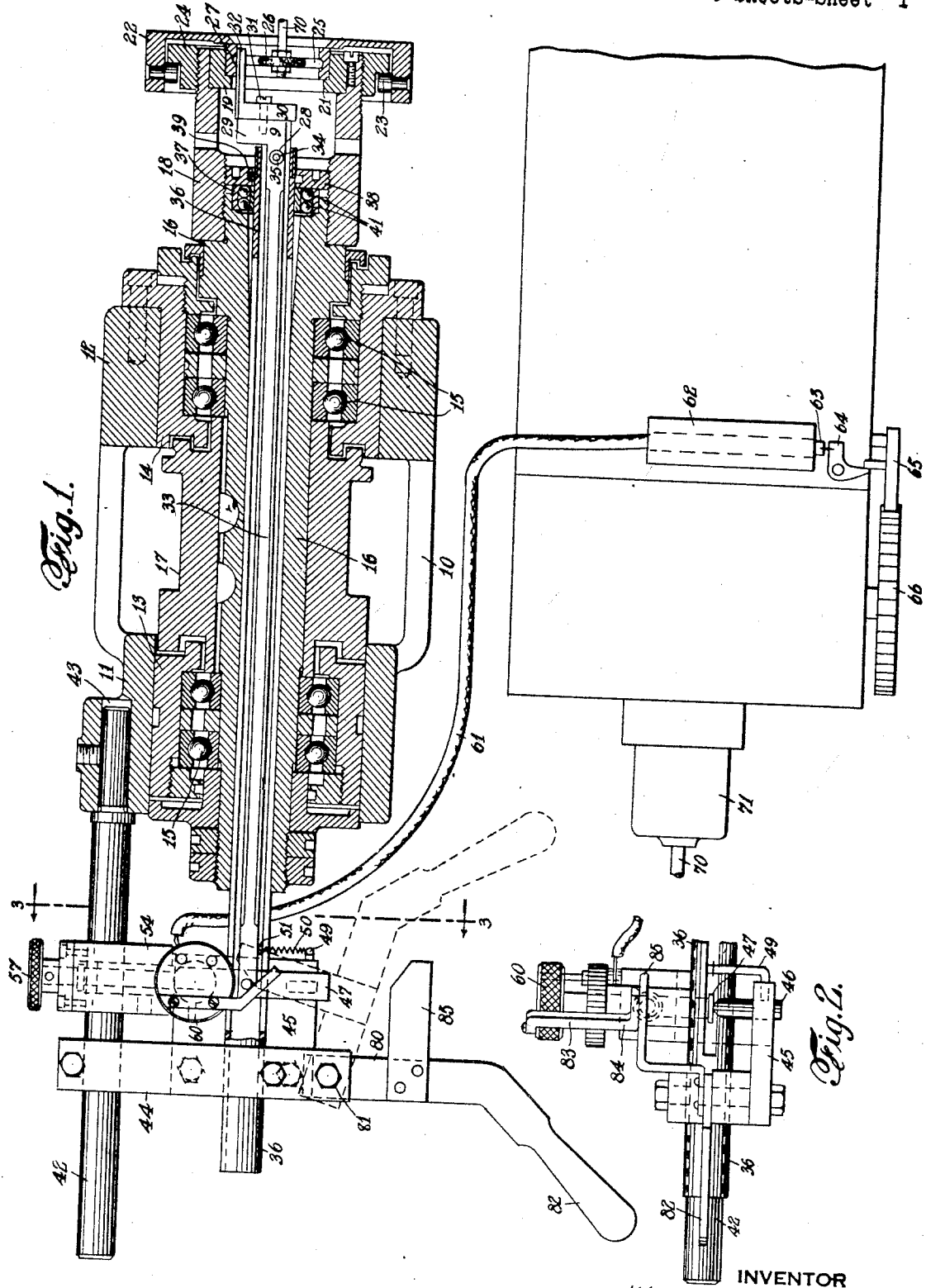
INVENTOR
WALTER L. HUTCHINSON
BY Chas. Lyon Newell
his ATTORNEY May 31, 1932.　　　W. L. HUTCHINSON　　　1,861,233
SIZING DEVICE
Filed June 11, 1930　　　3 Sheets-Sheet 2
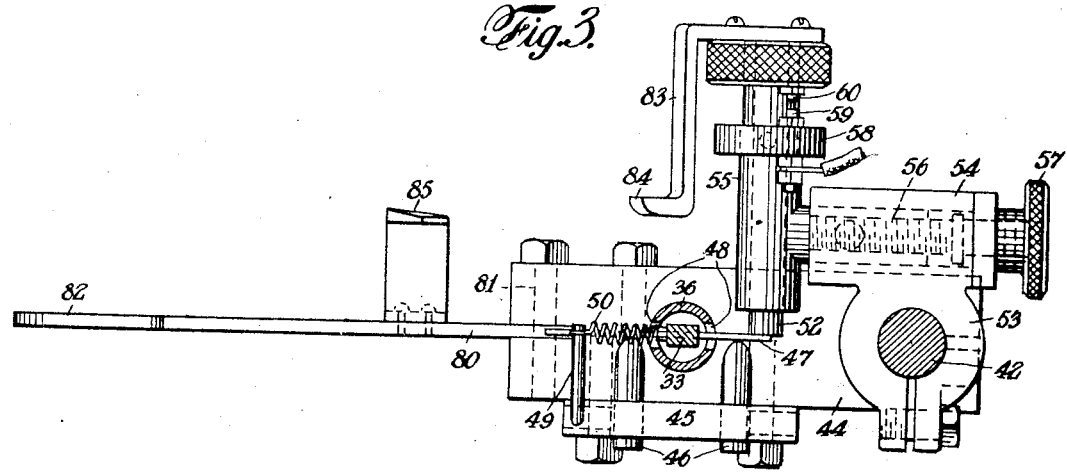
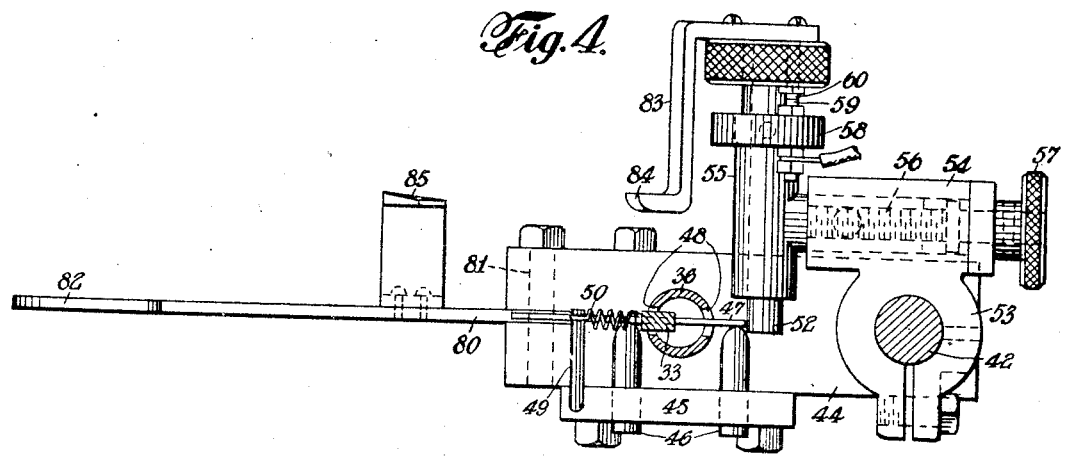
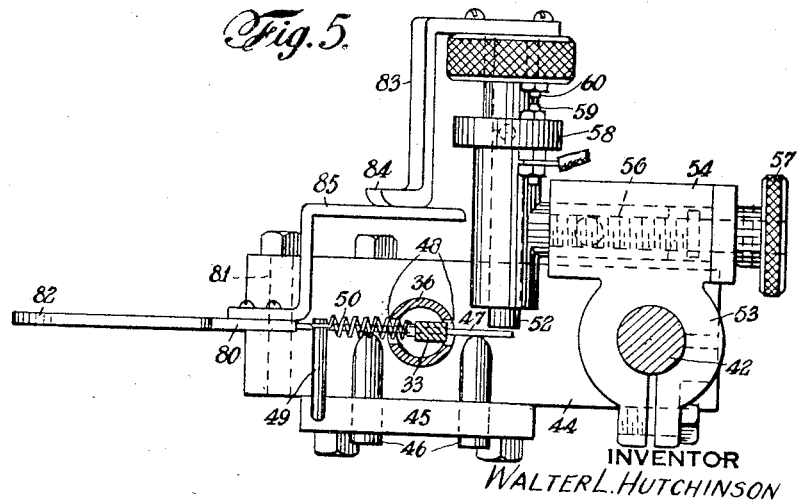
INVENTOR
Walter L. Hutchinson
BY
his ATTORNEY May 31, 1932. W. L. HUTCHINSON 1,861,233
SIZING DEVICE
Filed June 11, 1930 3 Sheets-Sheet 3
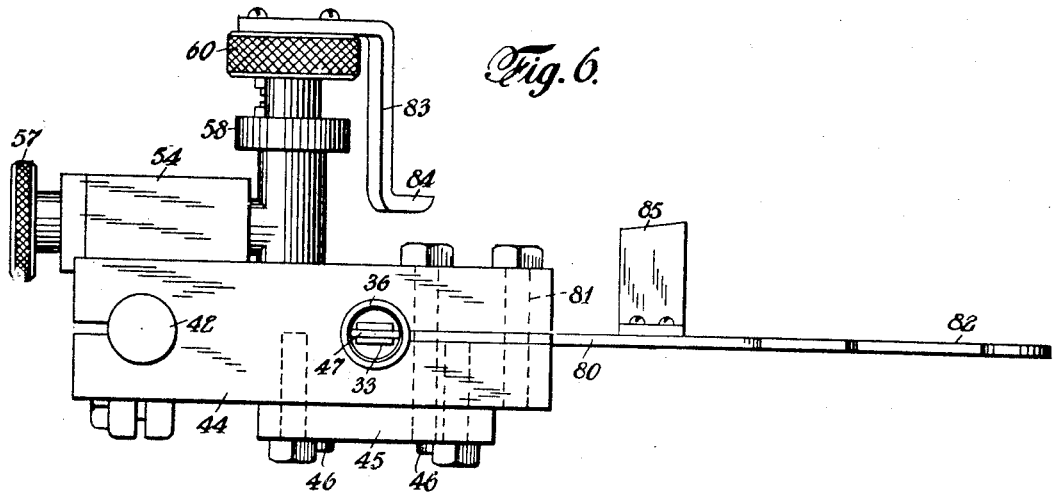
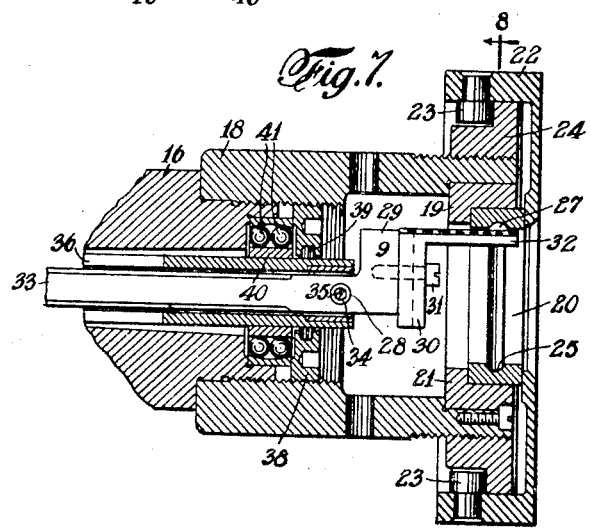
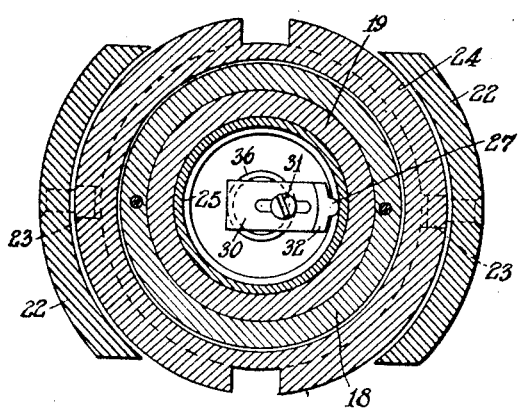
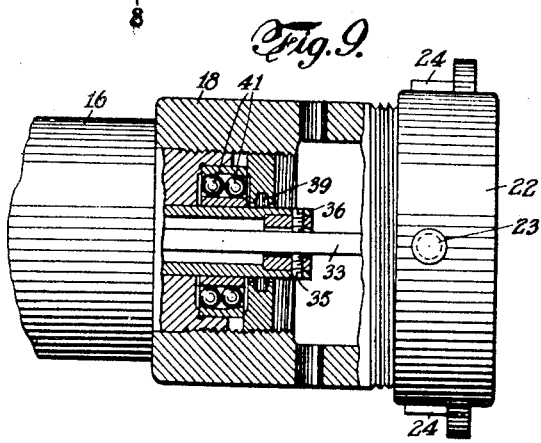
INVENTOR
WALTER L. HUTCHINSON
BY
ATTORNEY Patented May 31, 1932

1,861,233

UNITED STATES PATENT OFFICE

WALTER L. HUTCHINSON, OF HARTFORD, CONNECTICUT, ASSIGNOR TO THE SKAYEF BALL BEARING COMPANY, OF HARTFORD, CONNECTICUT, A CORPORATION OF CONNECTICUT

SIZING DEVICE

Application filed June 11, 1930. Serial No. 460,356.

This invention relates to devices for discontinuing or modifying the feed movement of grinding machines, particularly internal grinders, when the work has been reduced a pre-determined amount or to a pre-determined size and has for its object particularly to provide a machine of this character in which the actuating mechanism from a work contacting member or feeler passes backward10 ly through a hole or center bore in the work or chuck carrying spindle.

In the preferred form of the invention the work piece contacting member or feeler is carried by the short end of a lever, the long end passing backwardly through a tubular support located within the rotary chuck spindle, the support being held from rotation with the spindle. The movement of the lever upon its pivot in regard to the grinding down of the work is active for stopping the feed movement, preferably by tripping a device for closing an electric circuit which is active upon the feed pawl of the grinding machine. In the illustrative example, the op25 erative connection between the work contacting member and the tripping device passes backwardly of the work holder and through this and through the device which rotates it without partaking of its rotation.

The work contacting member or feeler while in its operative position and contacting with the work piece, does not partake of the rotation of the work piece.

The various details of construction and the mode of operation are set forth in the following description.

In the accompanying drawings, one practicable embodiment of my invention is illustrated, in which drawings:

Figure 1 shows a horizontal, longitudinal section of a portion of a grinding machine equipped with a preferred form of my sizing device, and a top view of other parts of the machine.

Fig. 2 is a detail view of the left hand end of Fig. 1 and at about right angles thereto.

Fig. 3 is a section of Fig. 1 taken at about the plane of the line 3—3 looking in the direction of the arrows, and showing the parts in the position they assume during the grinding operation.

Fig. 4 shows the parts of Fig. 3 in the tripped position as the work piece has been reduced to size.

Fig. 5 shows the same parts with the drop pin raised by means of the lifter lever, which lever also is shown as pressing the guide plate into a position to hold the feeler, not shown, away from the work.

Fig. 6 is an end view looking at Fig. 1 from the left hand end.

Fig. 7 is an enlarged view of the parts shown at the right hand end of the upper portion of Fig. 1 showing the feeler and chuck and associated parts.

Fig. 8 is a cross section through the chuck and work piece and showing the feeler in end view, the section being taken at about the plane of the line 8—8 of Fig. 7 looking from the right hand side, and Fig. 9 is a detail showing some of the parts represented in Fig. 7, but at about right angles thereto, illustrating particularly the pivot points and the manner in which they are carried.

In using the preferred form of the invention, upon the work coming to its required size, the circuit of an electric feed throw-off is actuated. Whether or not the agent or force set in motion to stop the feed be electricity is quite beside the main discovery upon which this piece of mechanism is based. Certain of the elements of the machine which are presently to be described enter into the main discovery, and I have clothed these with mechanism to place the invention in operative relation to a grinding machine, one of my chief concerns being to locate all the parts except the feeler proper back of the work piece and to pass the operating lever through the work spindle and to steady the pivot of the lever and hold it from rotation.

The improved sizing device is shown mounted upon the work head of a well known form of internal grinder, most of the machine being broken away or not illustrated. The head is shown supported by a part 10 of the machine frame, this head comprising a rear housing member 11 and a front housing member 12 which, among other things, are shown carrying sleeves 13 and 14. Each sleeve encloses a pair of anti-friction bearings, designated generally by the reference character 15. The inner members or race rings of these bearings are shown mounted upon a hollow spindle 16 which has keyed to it a belt pulley 17 located between the pairs of anti-friction bearings.

The various parts for holding the anti-friction bearings and the other elements of the machine not forming any part of this invention are shown of conventional design. A chuck body 18 is shown mounted on the front end of the spindle 16 and carries at its front end chuck members, comprising an adapter 19 designed to conform to the outer perimeter of the work piece, in the present instance the outer ring 20 of a ball bearing, the adapter being formed with a shoulder 21 for limiting and positioning the inward movement of the bearing when this is clamped in the chuck by means of a cover 22 which is seated in position by means of rollers 23 running on cam faces of a cam ring 24.

The work piece illustrated herein, the ball bearing ring 20, is held in proper position for the grinding of its race track groove 25. A grinding wheel 26 is shown mounted on the shaft 70 of the motor 71.

It has been found in grinding surfaces and particularly the inner surfaces of work pieces, such for instance as that herein illustrated a groove of a ball bearing, that a suitable feeler having contact with a moving surface as it is being ground, can indicate within very close tolerances when the piece has reached its desired size. It has also been found that it is best to use an automatic throw-off or stop feed movement when the piece has reached its size rather than to rely upon the operator watching a visual indicator, but nevertheless to rely upon the operator for separating the work piece and the grinder, at the proper time after the feed movement has been automatically stopped, and the present design illustrating my invention is based upon that theory.

It is to be noted that a lever 9 of the first order is illustrated for carrying the feeler and tripping the circuit closer of the stop feed. This lever 9, which carries the work contacting member or feeler, a diamond 27 in the illustration, may be termed a "knock-off lever" and is shown fulcrumed at 28, the fulcrum of the lever being near the feeler, and a very long arm projecting backwardly to perform the tripping function. The short arm which carries the feeler or contacting member 27 is made up of a head portion 29 upon which is mounted an L-shaped diamond holder, one leg 30 being secured by means of a set screw 31 for transverse adjustment on the head 29, the other leg 32 carrying the diamond 27 is disposed at about right angles to the leg 30 and the transverse head 29. This constitutes the short end of the lever. The leg 32, it will be seen, is off-set in relation to the long end 33 of the lever. The fulcrum 28 of the lever is furnished by a pair of pivot screws carried by a pivot plug 34, the pivot screws having conical ends entering suitable recesses in the sides of a block 35 carried by the knock-off lever.

The pivot plug 34 is shown set in the end of a tube 36 which may be called an "indicator tube." This tube passes from a position within the chuck through the hollow spindle 16 and out through the back of the machine, and is shown as longitudinally slotted at both sides except at its ends. The plug 34 has an opening sufficiently large to permit the introduction and movement of the knock-off lever.

The indicator tube 36 is shown supported within the hollow spindle 16 and immediately back of the chuck by means of an anti-friction bearing which is capable of permitting a certain amount of self-adjustment. In the present illustration a self-aligning ball bearing is employed, it comprising an outer ring 37 seated in a recess formed in the end of the hollow spindle 16 and held in place by means of a closure plate 38 screwed into the rear end of the chuck body 18. The internal screw thread on the chuck body which engages a screw thread formed on the outer portion of the reduced end of the spindle 16 being continued forwardly for receiving this closure plate which is illustrated as provided with some suitable labyrinth or packing 39. The inner race 40 of the ball bearing is mounted directly upon the indicator tube 36. Two series of balls 41 are shown located between the inner and the outer ball races. The indicator tube 36 is held from rotation by means of a supporting device at the rear end of the machine.

This supporting device is shown as comprised of a support rod 42 tightly held in a socket 43 formed in the rear housing member 11. A support block 44 is adjustably clamped to the support rod 42 and is also adjustably clampd to the rear end of the indicator tube 36.

From the foregoing it will be seen that the knock-off lever carrying the work contacting member or feeler and the associated parts, while passing through and supported by rotating elements, are, nevertheless, secured and held from rotation with the work piece.

Whatever vibration which may take place at the rear end of the machine in relation to the chuck or front end will not materially affect the sensitiveness of the feeler since the ratio of the ends of the lever is so great and this slight vibration will prevent any clamping or injury, owing to the fact that the support for the pivot is carried by its self-aligning bearing.

There is shown secured to the lower side of the support block 44 a plate 45 which may be called an "aligning plate." The plate is shown projecting beyond the front edge of the support block and carrying a pair of aligning pins 46, one located in front of and the other at the rear of the indicator tube 36. These aligning pins 46 are for supporting the rear guide plate 47. This plate 47 is carried at the rear end of the knock-off lever, preferably at the extreme end, and is disposed transversely of and projecting through openings 48 formed at the front and rear of the indicator tube 36. The pivot pins constituting the fulcrum are caused to stand still within the rapidly rotating chuck spindle, and are steadied and supported on the rotating spindle by the instrumentality of a ball bearing capable of at least a small amount of self-alignment. The top ends of the aligning pins 46 are carefully rounded so as to present the minimum amount of friction to the movement of the plate 47 upon them. The support block at the front end is shown carrying a spring rod 49, to which is attached one end of a coiled spring 50. The other end of the spring is attached to a suitably formed eye 51 carried by the knock-off lever just forwardly of the position of the rear guide plate.

The spring 50 is for the purpose of urging the feeler 27 into contact with the work piece and for withdrawing the plate from beneath the drop pin 52, presently to be described, upon the completion of the pre-determined amount of grinding away of the work piece.

When there is no work piece in the chuck for the contact of the feeler the movement of the knock-off lever in response to the spring 50 is limited by the engagement of the lever with the inside of the tube 36.

The circuit closure contained in the illustrative example is carried by the support rod 42 and comprises an adjusting block 53 which is adjustably clamped to the support rod 42 and has adjustably mounted upon it a tee 54 which is provided in the illustration with a substantially vertically disposed socket 55 in which the drop pin 52 is so mounted that it may fall by gravity from a raised position when its support is removed.

The lower end of the drop pin, see Fig. 3, rests upon the rear guide plate and when in this elevated position maintains the circuit of the feed control mechanism open.

Fig. 4 represents a position assumed by the parts when the work piece has been reduced to its predetermined dimension which causes the lever 33 to move toward the left in Fig. 4, sliding the plate 47 across the top of the aligning pins 46 and withdrawing it from beneath the drop pin 52.

The timing of the dropping of the pin is effected by means of an adjusting screw 56 mounted in the adjusting block and perfectly actuated by means of a knurled knob 57.

An insulator block 58 is shown mounted on top of the adjusting block 53 and carrying an electrical contact 59 which is in position to be engaged by the lower side of the head 60 of the drop pin when this is permitted to drop by the withdrawal from beneath it of the guide plate.

The circuit from the pin 59 and head 60 is illustrated as an electric conductor 61 running to a solenoid mounted on the machine frame. The core 63 of the solenoid, active upon a block crank lever 64 which is capable of withdrawing the feed pawl 65 from the feed ratchet wheel 66. The return circuit is preferably grounded on the machine frame.

A lifter lever 80 is provided for lifting the drop pin 52, not only to a position where it may rest upon the guide plate, but to a position above it so that the guide plate and associated parts may be freely moved for the purpose of withdrawing the feeler well out of the path of movement of the work piece, both during the time of unchucking the finished piece and chucking a fresh piece, and also during the preliminary or rough grinding operations. The lifter lever 80 is shown pivoted to the support block 44 at 81 and has a handle portion 82 extending to a position where it may be conveniently manipulated by the operator. A lifter arm 83 is shown secured to the head 60 of the drop pin and provided at its lower end with a foot 84 having a cam shaped toe for riding up on a lifter arm 85 secured to the lever 80, see Fig. 5.

When the lifter lever 80 is swung into its operative position the lifter arm 85 engages the cammed toe of the foot 84 of the lifter and lifts the pin into such a position that the electrical circuit is open and the lower end of the pin is well above the path of movement of the guide plate 47. The body of the lever 80 also in this movement engages the end of the guide plate 47 and pressing this against the action of the coiled spring 50, rocks the knock-off lever on its pivot and moves the feeler 27 to the extreme limit of its backward movement.

When a work piece has been placed in the chuck and ground down so that there is a sufficiently smooth surface to safely permit the contact of the feeler with it, the operator returns the lifter lever 80 to its idle or Fig. 1 position. This permits the spring 50 to rock the knock-off lever and bring the feeler into contact with the work and also permits the drop pin 52 to drop by gravity, and if at this time the work piece has not been ground down to the selected internal diameter, the movement of the pin will be arrested by the rear guide plate 47 and held at that position which is an open circuit position until such time as the work piece is ground down to the selected size.

When the work does reach the pre-determined or selected size, the rocking of the lever 9 caused by the feeler 27 following the ground surface, swings the long end 33 on the knock-off lever and moves the guide plate over the tops of the aligning pins 46 and withdraws the plate from beneath the drop pin 52 permitting this to drop and also permitting the head 60 of the drop pin to engage the electrical contact 59 and close the circuit of the stop feed mechanism.

Having thus described my invention, I claim and desire to secure by Letters Patent:

1. In a machine tool having a frame, the combination with a rotary hollow spindle mounted on the frame and a work holder carried at the front end of the spindle, of a feeler disposed within the work holder in position to contact with a work piece located therein, means journalled in and extending through the spindle from its back end and carrying at the front end the feeler, and means for restraining the feeler from partaking of the rotation of the work piece.

2. The combination with a rotary hollow spindle and a work holder carried by the spindle at its end, of a stationary tube located within the hollow spindle, means for supporting the tube upon the spindle at a short distance behind the work holder, and a lever fulcrumed on the tube forwardly of the said support, the long end of the lever extending backwardly through the tube, and a feeler mounted on the short end of the lever and in position to contact with a work piece located in the work holder, the organization being such that the feeler is held from rotation with the rotating work piece.

3. The combination with a rotary hollow spindle and a work holder carried by the spindle at its end, of a stationary member located within the hollow spindle, an anti-friction bearing for supporting the member upon the spindle at a short distance behind the work holder, and a lever fulcrumed on the said member, one end of the lever extending backwardly through the spindle, and a feeler mounted on the other end of the lever and in position to contact with a work piece located in the work holder, the organization being such that the feeler is held from rotation with the rotating work piece.

4. The combination with a rotary hollow spindle and a work holder carried by the spindle at its end, of a stationary member located within the hollow spindle, an anti-friction bearing for supporting the member upon the spindle at a short distance behind the work holder, and a lever fulcrumed on the said member forwardly of the anti-friction bearing, the long end of the lever extending backwardly through the spindle, and a feeler mounted on the short end of the lever and in position to contact with a work piece located in the work holder, the organization being such that the feeler is held from rotation with the rotating work piece.

5. The combination with a rotary hollow spindle and a work holder carried by the spindle at its end, of a stationary tube located within the hollow spindle, an anti-friction bearing having its inner race ring mounted on the tube and its outer race ring mounted within the spindle at a short distance behind the work holder, a lever fulcrumed on the tube forwardly of the anti-friction bearing, the long end of the lever extending backwardly through the tube, and a feeler mounted on the short end of the lever and in position to contact with a work piece located in the work holder, the organization being such that the feeler is held from rotation with the rotating work piece.

6. In a machine tool having a frame, the combination with a hollow spindle rotatably mounted on the frame, of a work holder mounted on the front end of the spindle, a tube disposed within the hollow spindle and extending backwardly beyond the back end thereof, a bracket mounted on the frame and supporting the back end of the tube, an anti-friction bearing having its inner race ring mounted on the front end of the tube and its outer race ring mounted within the spindle at a short distance behind the work holder, the tube being longitudinally slotted between its ends, a lever fulcrumed on the tube forwardly of the anti-friction bearing, the long end of the lever extending backwardly into the tube and adapted to pass through the slots thereof, a feeler mounted on the short end of the lever and located in position to contact with a work piece in the work holder, a plate carried at the free end of the longer arm of the lever and extending through the slots at the sides of the tube, a pair of upstanding and aligning pins carried by the bracket at the respective sides of the tube and located in position for supporting and guiding the lever carried plate, a drop pin and means for supporting this in position to ride on the plate during certain conditions of the work.

Signed at Hartford this 31st day of May, 1930.

WALTER L. HUTCHINSON.